United States Patent [19]

Arora et al.

[11] Patent Number: 4,919,962

[45] Date of Patent: Apr. 24, 1990

[54] COFFEE FLAKES AND PROCESS

[75] Inventors: Vijay K. Arora, Montvale, N.J.; Gary V. Jones, Bremen, Fed. Rep. of Germany; John M. Kovtun, Rahway; Lawrence S. Brandlein, Englishtown, both of N.J.

[73] Assignee: General Foods Corporation, White Plains, N.Y.

[21] Appl. No.: 247,982

[22] Filed: Sep. 22, 1988

Related U.S. Application Data

[63] Continuation-in-part of Ser. No. 231,811, Aug. 12, 1988, abandoned.

[51] Int. Cl.$^5$ ............................................. A23F 5/38
[52] U.S. Cl. ..................................... 426/594; 426/388; 426/448; 426/650; 426/651
[58] Field of Search ............... 426/594, 651, 650, 448, 426/388

[56] References Cited

U.S. PATENT DOCUMENTS

| | | | |
|---|---|---|---|
| 2,906,630 | 9/1959 | Turkot et al. | 426/594 X |
| 2,929,717 | 3/1960 | Eskew | 426/594 |
| 3,419,399 | 12/1968 | Earls et al. | 426/388 |
| 3,625,704 | 12/1971 | Andre et al. | 426/594 X |
| 3,708,311 | 1/1973 | Bolton et al. | 426/438 |
| 4,154,864 | 5/1979 | Risler et al. | 426/594 |
| 4,317,842 | 3/1982 | El-Hag et al. | 426/438 X |
| 4,503,127 | 3/1985 | Fan et al. | 426/438 |

*Primary Examiner*—Joseph Golian
*Attorney, Agent, or Firm*—Daniel J. Donovan; Thomas R. Savoie

[57] ABSTRACT

A thin, transparent coffee glass is disclosed which is prepared by forming a mixture containing above 4% to 12% water and about 88% to above 96% total coffee derived solids. These solids can further contain up to 20% hydrolyzed mannan and oligomers having a DP from 1 to 10 and up to 10% coffee cellulosic sugars. The coffee melt is characterized by having a glass transition temperature between 30° C. to 80° C. The coffee melt is heated to a temperature of 60° C. to 130° C. and extruded into a thin continuous film, stretched to further form a thin film which is rapidly cooled into a hard coffee glass which is shiny on both sides, dark in color and transparent. This transparent glass is then dried to a stable moisture content. The coffee glass provides a shiny appearance to any coffee product it is combined with an is an excellent means of entrapping and protecting coffee aromas. Furthermore, the coffee glass provides a means for shaping numerous new coffee products. The thin flakes of coffee glass disolve rapidly.

7 Claims, 3 Drawing Sheets

70X

140X

290X

70X

140X

290X

COFFEE FLAKES AND PROCESS

CROSS REFERENCE TO RELATED APPLICATIONS

This application is a continuation-in-part of co-pending application Ser. No. 231,811, filed Aug. 12, 1988, now abandoned.

TECHNICAL FIELD

This invention relates to vegetable extracts, more specifically extracts of coffee and processes for producing stretched, transparent, coffee glass films and products thereof. A homogeneous coffee melt is drawn into thin films which are rapidly cooled. If desired, the coffee may be aromatized prior to stretching to the desired shape. An object of this invention is to provide economical processes for preparing very thin films of coffee glass and preparing shelf-stable coffee products thereof which have not suffered from heat damage and yet may be quickly reconstituted in water to yield coffee of excellent flavor and aroma. The process is particularly suitable for producing thin films of transparent coffee glass which can be flaked or otherwise sized and dried to a stable condition. The glass is obtained from a homogeneous, high solids coffee melt by stretching the melt into thin films which cool rapidly at ambient conditions and minimize or virtually eliminate volatile losses.

PRIOR ART

The present invention is concerned with the manufacture of of vegetable extracts and, particularly, instant coffee. The manufacture of instant coffee involves extracting roasted and ground coffee beans with water under conditions of high temperature and pressure to form extracts which are dried with or without aromas added by known means such as spray-drying, freeze-drying or the like.

In an early effort to avoid drying of such coffee extracts by Eskew, U.S. Pat. No. 2,929,717, issued Mar. 22, 1960, a fifty-fifty mixture of concentrated coffee extract and an invert sugar solution were concentrated in a thin film evaporator to form a product having four percent or less water which was pumped out of the evaporator and formed on chilling rolls into small flakes which were easily broken into a coarse product before packaging. In this process, the product temperatures exiting the evaporation ranged from 220° F. to 290° F. and the products produced had moisture contents of about 1 to 4% and were hydroscopic by reason of the addition of large amounts of the invert sugars. This type of processing was also applied by Turkot et al., U.S. Pat. No. 2,906,630, issued Sept. 29, 1959. While the process of Eskew and Turkot et al. produced coffee products without the need to spray-dry, a filler was employed which is not suitable in today's coffee market. Furthermore, special packaging would be required to reduce the chance of moisture contamination which would be disastrous because of the hygroscopisity of the coffee product produced.

In another attempt, Earle Jr., et. al., U.S. Pat. No. 3,419,399 patented Dec. 31, 1968, prepared aromatized soluble coffee doughs having a moisture content of 9.5 to 12.5% at a temperature below 140° F. and then dryed the dough to 1–4%. This material was very sticky and difficult to process.

Another attempt to produce dehydrated vegetable extracts is disclosed by Risler, et. al., U.S. Pat. No. 4,154,864, issued May 15, 1979. Risler, et. al. formed a paste or powder which is extruded into a subatmospheric pressure chamber to puff the coffee product. For example, freeze-dried instant coffee powder, having a moisture content of 2.5%, is extruded into a chamber at 80 mb and cut to form grains about the size of a pea which dissolve in cold water. When compared to these grains extruded into atmospheric pressure in Example 5 of that patent, the products with cellular internal structure are far more soluble.

In U.S. Pat. No. 3,625,704 to Andre, et al, issued Dec. 7, 1971, dense flakes of instant coffee are prepared and aromatized from roll-milled instant coffee.

In the field of flavor fixation, particularly of essential oils, a number of patents have been issued which deal with forming a carbohydrate glass to protect the flavor. The U.S. Pat. No. 3,041,180, issued to Swisher, discloses a method for fixing flavorants in an extruded carbohydrate substrate. The product of the Swisher invention is obtained by emulsifying an essentially water-insoluble essential oil with a molten mixture of glycerol and corn syrup solids as the continuous phase, extruding the emulsified mass in the form of filaments into a cold fluid, preferably an organic solvent for the essential oil which is a nonsolvent for the corn syrup solids, followed by impact breaking of the solidified filaments into small particles of usable form and then holding the particles in the solvent, preferably for an extended period, to remove essential oil from the surfaces of the particles together with a substantial portion of the residual moisture contained on and in the particles. This methodology is conducted in excess of 130° C. U.S. Pat. No. 3,704,137 to Beck discloses a method for preparing an essential oil composition. His method involves the cooking of an aqueous solution of sucrose and hydrolyzed cereal solids until it is at a boiling point of about 122° C., and the water level reaches a desired minimum. At this point, the heating is stopped, the mixture is agitated, and an emulsifier is added. The emulsifier is necessary in order for a homogeneous solution. While the solution is cooling, the essential oil and an antioxidant are added, and are intimately mixed. The final mix is forced through an extruder under air pressure. At this point, about 0.5% by weight of the final composition of an anticaking agent is added to prevent the particles from sticking.

U.S. Pat. No. 4,004,039 to Shoaf et al. discloses a process for the encapsulation of "Aspartame" in any number of matrix forming materials. The product is formed by creating a hot melt which, upon cooling, is capable of forming a relatively amorphous matrix within which the sweetener is discretely dispersed.

EPO published patent application No. 0158460 to Pickup et al., teaches a method for fixing volatile flavorants in a food-approved substrate, and more particularly, to a low-temperature methodology for fixing volatile flavorants in an extruded "carbohydrate-glass" substrate. Volatiles or essential oils are dry blended with 10–30% low molecular weight carbohydrate food acid or the like and at least 70% of a high molecular weight polymeric carbohydrate which contains at least 95% material above 1000 molecular weight. The dry mixture is extruded to form on cooling a hard glass like substance.

While these methods have enabled workers in the art to produce useful food products, they have not provided a means for producing aromatized coffee glass which is prepared from 100% coffee derived material.

SUMMARY OF THE INVENTION

It has been discovered that a stable instant coffee product can be prepared from a process which involves obtaining a mixture containing 3% to 12% water preferably above 4% to 9% water, and about 91 to about 96% total coffee derived solids by either concentrating conventionally extracted coffee or by reconstituting instant coffee products either spray-dried, freeze-dried or otherwise with water or extract. The mixture obtained has a glass transition temperature of between 30° C. to 80° C. The mixture is heated and then forced through a suitable orifice or shaping deivice under pressure whereupon it expands and is immediately stretched to reduce its thickness. The stretching of the expelled coffee sheet to a thin, continuous, transparent film also provides instantaneous cooling of the film due to very high surface-to-mass ratio. The thin, continuous, transparent film, upon cooling to ambient temperatures, turns into a brittle, stable glass having dark brown color and high gloss on both sides. The coffee glass is then sized, screened to less than 3 mm particle size, and then dried, if necessary, to a stable moisture of 6% or less.

This invention, in addition to working well with conventionally extracted roasted and ground coffee extracts, can also be applied to those extracts which are obtained from coffee by heat, acid, enzymatic or base hydrolysis. For example, a portion of the coffee solids, may be derived from hydrolyzed mannan which forms oligomers having a DP anywhere from 1 to 8. These materials are generally obtained by high pressure, short time, high temperature treatment of residual coffee grounds which cause the mannan to be hydrolyzed to lower molecular weight oligomers, having DP's up to 8. The coffee can also contain cellulosic sugars derived from the cellulosic components of coffee which are produced by the enzymatic, acid or base hydrolysis of such coffee solids.

Whether using reconstituted soluble coffee powders or using concentrated coffee extract or mixtures of each, it is advisable to form as uniform and homogeneous a mixture as possible. Furthermore, it is essential to adjust the moisture content between above 4% to about 12%, preferably above 4%-9%, and form a hot melt at a temperature of 70° C. to 110° C. so that when the melt is extruded to a thin sheet and is cooled there is obtained a thin, transparent, coffee glass or super-cool liquid.

The products are prepared from coffee solids having above 4% to 12% water by heating the mixture to 70° C. to 110° C., more preferably 80° C. to 100° C., and by forcing the mixture or hot melt through a restricted area to shape it and thereafter as it expands from the restriction immediately stretching the shaped mixture as uniformly as possible to reduce its thickness and provide rapid cooling. The stretching helps in the formation of a surface hardening which appears to help prevent loss of aroma and flavor. The cool glass sheet is then ground, sized and dried to a stable moisture content of 6% water or less, usually 2.0-5.0%, more particularly 2.5 to 5.0%. In a preferred embodiment, the hot material leaving the restricted area after being shaped is immediately stretched into a thin transparent film by pulling it with a chain belt or other mechanical device which travels faster than the shaped coffee melt exiting the restricted area. This pulling action reduces the film's thickness some 2 to 10 times thus rapidly cooling the melt to form a brittle uniform, transparent coffee glass having a thickness of from 1 to 15 mils, preferably 1 to 5 mils.

At 15 mils the material is not transparent because of the thickness of the film and its dark color. At 1-5 mils you can see through the dark sheet of coffee.

This glass is then suitably reduced in size and dried to a stable moisture content of below 6%, preferably below 5% water. The thin transparent darkly colored flakes are shiny on both sides, almost totally uniform, i.e., less than 5% voids and dissolve within 15 seconds in hot 160° F. water to form a soluble coffee product. If desired, these flakes may be agglomerated with soluble coffee.

BRIEF DECRIPTION OF THE DRAWINGS

FIGS. 1, 2 and 3 are photomicrographs of flakes of soluble coffee magnified at 70×, 140× and 290× which show a product of non-uniform structure with a somewhat smooth surface believed to be prepared as disclosed by Risler et al, in U.S. Pat. No. 4,154,864. FIGS. 4, 5 and 6 are photomicrographs at 70×, 140× and 290× of the thin transparent homogeneous flakes produced by this invention. Notice the absence of voids (less than five percent) and uniform character of the solids of FIGS. 4-6 compared to the rough surface effect shown by FIG. 2 and the non-uniformity and voids of FIGS. 1 to 3. The non-uniformity is believed caused by soluble coffee particles which retain their shape during rolling of the flakes using compressing rolls.

DETAILED DESCRIPTION

Figure 1:
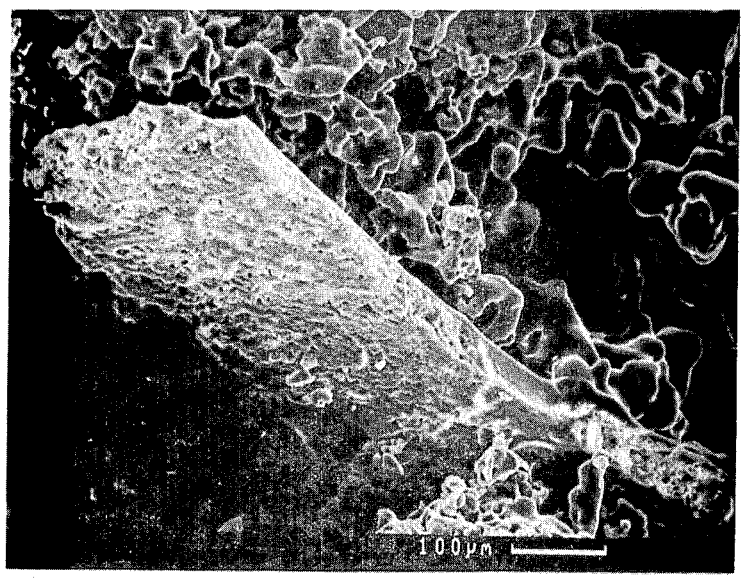
Figure 2:
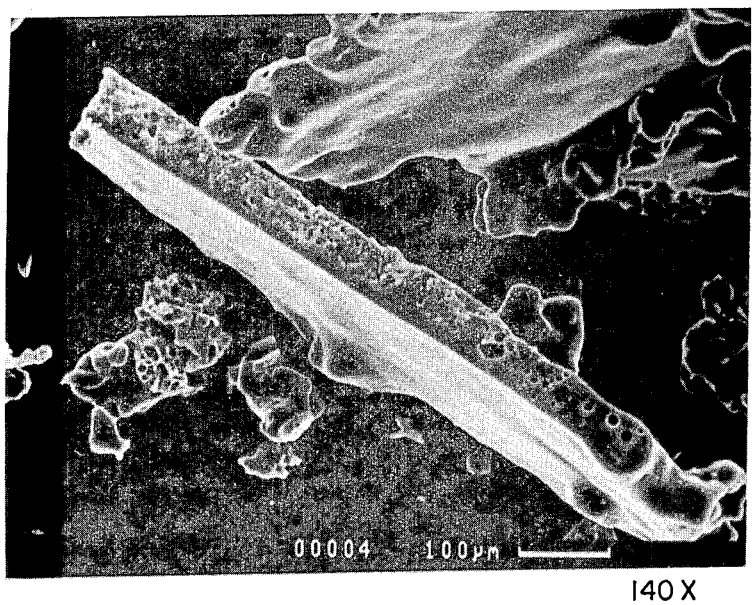
Figure 3:
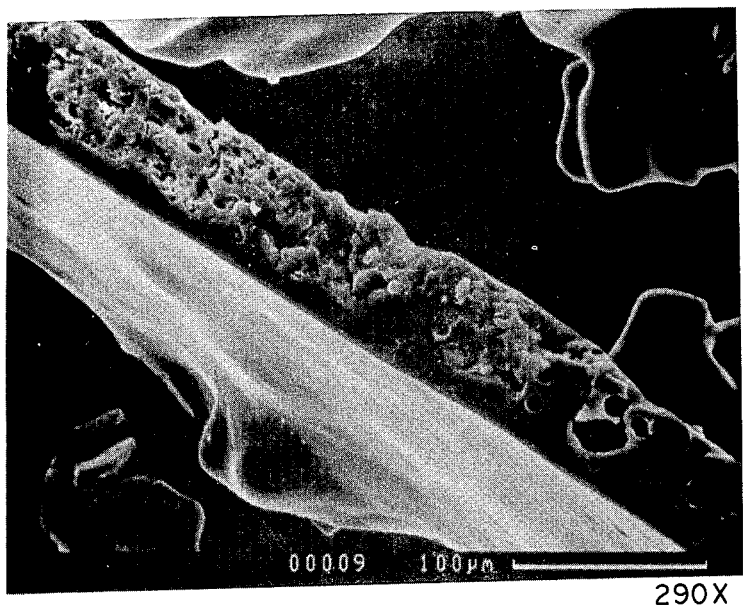
Figure 4:
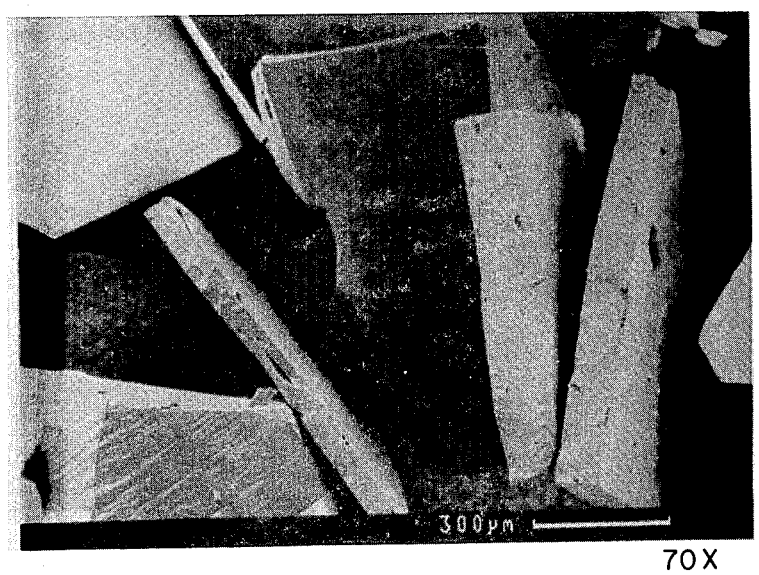
Figure 5:
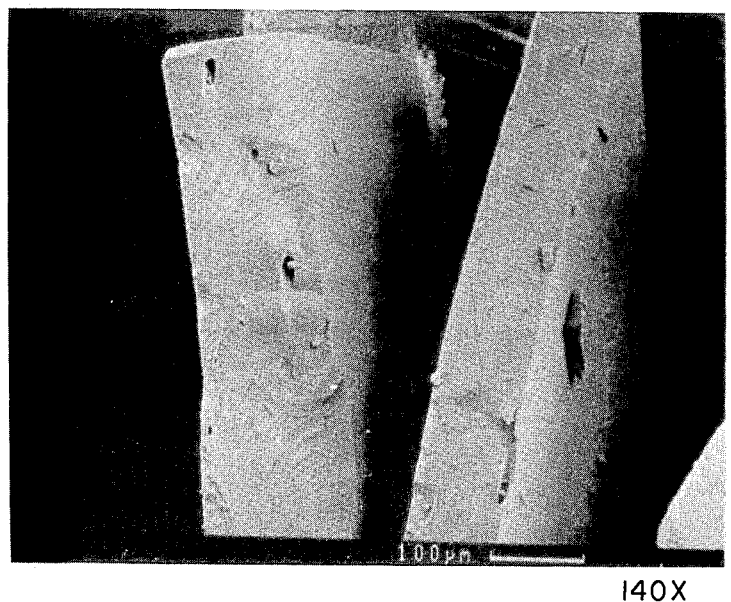
Figure 6:
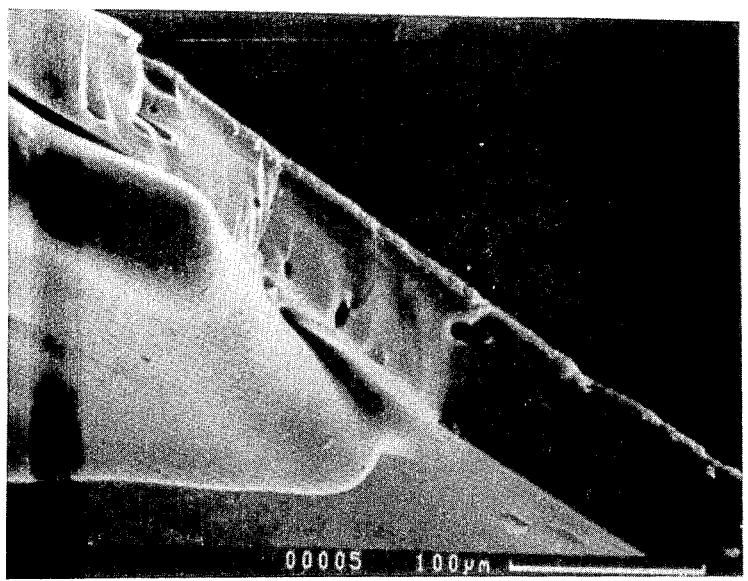

In accordance with the present invention, a uniform, homogeneous coffee melt is prepared by (a) forming a mixture of 88% to 96% preferably 91% to less than 96% coffee solids, and above 4% to 12% water, preferably above 4% to 9% water; (b) adjusting the mixture's above 4% to 9% water; (b) adjusting the mixture's temperature to from 60° to 130° C., more preferably 70° C. to 110° C., most preferably 80° to 100° C.; (c) blending to form a uniform, homogeneous mixture; (d) forcing the uniform mixture through a restricted area, or sheeting die having an opening of 2 to 20 mils., at pressures of up to 2,500 pounds per square inch; (e) stretching the mixture or melt immediately as it is discharged from the restricted area and subjecting the melt to uniform pulling using a travelling belt or other device which reduces the thickness of the sheet to 1 to 15 mils. (a 2 to 10 times reduction in thickness of the expanding melt leaving the die) and allows rapid cooling to form a thin, transparent hard glass; finally, the cooled material is (f) suitably treated by reducing the glass in size; and (g) drying is necessary to produce a coffee glass of stable moisture content.

Suprisingly, we have found that stretching the melt actually improves aroma retention in the resulting supercooled coffee glass, perhaps by speeding up the surface cooling of the melt to glass form and preventing evaporative loss of the aroma.

The coffee mixture can be prepared from coffee extract obtained by normal percolation by subjecting the extract to falling film evaporators or other suitable devices, to obtain a solids content of at least 88% and, more preferably, 91% or more. The solids content, should be at least 80%, preferably 91%, and, most preferably, less than 96% to form a mixture which has certain properties to allow proper extrusion of the coffee melt. The coffee mixture can also be obtained by mixing dried coffee solids, spray-dried, freeze-dried or otherwise, with sufficient water, aroma, extract or concentrated extract to produce a moisture content between above 4% and 12%, more preferably about 4% and 9% water and 91 to less than 96% coffee solids.

With sufficient mixing and heat there is produced a uniform, homogenous material which is similar physically to that obtained by concentration of coffee extract to the desired solids content. In either case, the coffee solids should have the following characteristics to ensure the production of a coffee melt which will form a suitable glass. The mixture should have a glass transition temperature of between 30° C. to about 80° C., preferably 40° C. to 65° C.

By glass transition temperature, we mean the liquification upon heating through this region of a material in a glassy state to one in the fluid state. The transformation is indicated by a change in a second order thermodynamic quantity such as the expansion coefficient or heat capacity. The change is due to the onset of extensive molecular motion which occurs in the transformation from a glass to a liquid. The change can be characterized by a glass transition temperature or Tg. Measurements of the dimensional stability of a material over a range of temperatures can be used to derive the Tg. A pentration thermogram as generated by the Thermomechanical Analyzer (TMA; manufactured by Perkin-Elmer) is used as the source of dimensional data. As described in the Applications Section of the Instruction Manual (Model TMS-2, publication #993-9246), Tg is identified as the temperature at which the first evidence of displacement of the penetration thermogram occurs from the pre-transition baseline.

The dry soluble coffee or concentrated extract used in this invention has a dry basis percentage composition as follows:

|  | % | Preferred % |
|---|---|---|
| Total Carbohydrates | 15-50 | 30-40 |
| Reducing Sugars included in total carbohydrates | 5-20 | 5-15 |
| Protein | 5-15 | 6-10 |
| Alkaloids | 0-6 | 2-6 |
| Chlorogenic Acid | 2-35 | 5-15 |
| Other Acids | 2-12 | 4-8 |
| Ash | 2-16 | 5-9 |

This process, in addition to working well with conventionally extracted roasted and ground coffee extracts, can also be applied to those extracts which are obtained from coffee by heat, enzymatic, acid or base hydrolysis. For example, a portion of the coffee solids, may be derived from hydrolyzed mannan which forms oligomers having a DP anywhere from 1 to 8. These high molecular weight materials are generally obtained by high pressure, short time, high temperature, moist treatment of residual coffee grounds which causes the mannan to be hydrolyzed to oligomers, having DP's up to 8. The coffee can also contain cellulosic coffee sugars derived from the cellulosic components of coffee which are hydrolyzed by the enzymatic, acid or basic hydrolysis of such coffee solids. In any case, the addition of such mannan oligomers and cellulosic derived coffee sugars does not produce such a reduction in the glass transition temperature such that the melt cannot be stretched, which would result in a failure to produce a coffee glass of acceptable hygroscopicity.

Once the mixture is prepared, it may be aromatized by injecting the aromas into the mixture and then homogenously blending the mixture. The aromas may be obtained from any source using known procedures. Aromas include synthetic and natural, aqueous, oil based, gaseous from roasted and ground coffee, coffee extract, coffee oil or the like.

In the preferred embodiment of our invention, we form thin films of the coffee material by forcing the mixture through slits, or other carefully designed orifices which produce uniform films of the material. This material is then directed immediately to a belt which picks up the film and stretches it by traveling at a rate of speed greater than the film is exiting from the extruder. The moving belt stretching the film is a convenient way to further regulate the thickness of the coffee film and to ensure rapid cooling of that film.

The film produced is transparent, dark colored and can be seen through at 1-6 mils. Its thickness varies from 1 to 15 mils. Other sizes could be made if desired. It can then be broken into the desired size and further dried to stabilize the product for storage. In general, the products exiting the die have moisture contents of between 5 to 10% and must be dried to stable moisture contents below 6%, preferably below 5%, most preferably 2.5-5%. Crystals which have been used for blending with soluble coffee have the following characteristics: $-8/+30$ U.S. mesh size, a 15°-22° L color and a bulk density from 0.35 to 0.6, preferably from 0.4 to 0.5 g./cc.

Coffee aromas may be added to the coffee mixture at any point prior to stretching. For example, the aromas may be injected into the mixture in the extruder. Suitable flavor and aromas include aromas collected from roasted and ground coffee called grinder gas, aroma from

EXAMPLE I

A spray-dried soluble coffee powder having a bulk density of about 0.26 g/cm$^3$ and a moisture of 2.5%, produced by conventional spray-drying techniques is fed to the hopper of a K-Tron gravimetric feeder. The K-Tron unit feeds the spray-dried powder into the fourth and fifth barrels of a Werner-Pfleiderer 57 mm, twin-screw extruder, Model No. ZSK 57, at a rate of 143 lb/hr. The extruder screws, turning at 107 rpm, convey the melting coffee powder through the extruder. Water is injected into the coffee melt between the sixth and seventh barrels of the extruder at a rate of 5.30 lb/hr. which is 3.7% water content based on the powder feed rate.

The coffee melt is extruded through a coat hanger shaped, laminar flow die 18 inches in width and having an opening of 0.005 inches from Scientific Process and Research, Inc. of Somerset, N.J. The die pressure is 351 psig. The hot sheet of coffee melt is pulled from the die by a 20" wide Kamflex continuous steel mesh belt conveyor, Model No. 731, with a belt speed of between 50 and 200 ft/min. As the sheet is pulled from the die it is stretched to a thickness of 0.001" to 0.005" from an initial thickness of about 0.01" to 0.05" resulting from die swelling. The thin continuous sheet of coffee melt cools rapidly to ambient temperatures along the belt and forms large, brittle pieces of coffee glass which are shiny on both sides. From the belt the large pieces are fed to a Model N Urschel grinder where they are ground into smaller flakes. The small flakes are then screened in a 12" SWECO vibrating separator. Particles that fall through the top (8 U.S. mesh) screen of the separator and rest upon the bottom (20 U.S. mesh) screen are collected as product. All flakes that either rest upon the 8 U.S. mesh screen or fall through the 30 U.S. mesh screen are recycled as feed to the extruder.

The screened flakes are dried in a Jeffery vibrating, fluid bed TMV 12"×20'6" drying and cooling system using hot air at about 195° F. and 2000 SCFM over the first 10 ft. of the system and ambient cooling air at 2000 SCFM over the last 10 ft. of the system. A coffee residence time in the drying system of about 2 minutes is required to reduce the glass moisture content to about 4.5% moisture. The glass is collected and re-screened using a 12" SWECO vibrating separator. Particles that fall through the top (8 U.S. mesh) screen of the separator and rest upon the bottom (30 mesh U.S. screen) are collected as product.

Spray-dried soluble coffee powder, similar to that fed to the extruder, is milled in a Fitzmill Model D grinder and then mixed with the screened flakes in a ribbon blender at a ratio of about 7 parts powder to 3 parts flakes. The powder/flake mixture is fed into the 10 foot diameter tower agglomerator via a Siletta loss-in-weight feeder at a rate of about 250 lb per/hr. Steam enters the agglomerator via one, two, or three nozzles at a total rate of between 125 and 500 lb/hr and a temperature of about 225° F. An airflow of about 2300 SCFM and 475° F. is directed down the tower from the plenum of the agglomerator. The air leaves the tower at about 220° F. The powder/flake feed agglomerates to form a shiny, sparkling powder-flake agglomerate. The agglomerate is conveyed from the tower discharge to a Rotex screener, Model No. 12 SAN ALSS, via a Cardwell vibrating conveyor. Agglomerate that falls through the top (8 U.S. mesh) screen and rests upon the bottom (30 U.S. mesh) screen of the Rotex are collected as product. Agglomerate that rests on the 8 U.S. mesh screen or falls through the 30 U.S. mesh screen is collected, ground, and fed as recycle to the agglomerator. The screened product, with a moisture of about Rotex screener, Model No. 12 SAN ALSS, via a Cardwell vibrating conveying. Agglomerate that falls through the top (8 U.S. mesh) screen and rests upon the bottom (30 U.S. mesh) screen of the Rotex are collected as product. Agglomerate that rests on the 8 U.S. mesh screen or falls through the 30 U.S. mesh screen is collected, ground, and fed as recycle to the agglomerator. The screened product, with a moisture of about 5.5%, is dried in a Jeffrey vibrating, fluid bed TMV 12"×20'6" drying and cooling system using hot air at about 195° F. and 2000 SCFM over the first 10 ft. of the system and ambient cooling air at about 2000 SCFM over the last 10 ft. of the system. A coffee residence time in the system of about 115 sec. is used. Agglomerate discharge, at about 4.5% moisture, is collected as product. The product has a unique, sparkling appearance.

EXAMPLE II

A series of investigations were made using the Werner-Pfleiderer 57 mm twin-screw extruder using an 18-inch laminar die having a 0.005 inch (5 mils) die opening. The configuration of the extruder is given in the following table which gives the temperature profile in each of the 10 sections of the extruder and the position of the coffee feed, water or extract addition. In each case the film was drawn down in size by pulling the film away from the die at a rate greater than its exit speed from the die. Film thickness between 1 to 15 mils. were achieved using the drawdown conveyor speed.

| Run | Extruder Barrel Section Temperature °F. | | | | | | | | | | Feed Rate Lbs./hr. | Coffee H2O Content % | Water Addition Rate lbs./hr. | Water Product % | Temp. at die exit °F. | Screw Speed RPM | Die Pressure PSIG | Torque % | Product Moisture Content % H2O | Remarks - location of: *Feed **water, aroma or extract addition |
|---|---|---|---|---|---|---|---|---|---|---|---|---|---|---|---|---|---|---|---|---|
| | 1 | 2 | 3 | 4 | 5 | 6 | 7 | 8 | 9 | 10 | | | | | | | | | | |
| (A) | *75 | 76 | 78** | — | 210 | 218 | 217 | 219 | 229 | 234 | 124.7 | 2.0 | 4.89 | 3.92 | 245 | 117.9 | 310 | 65.9 | (5.7) | Film was drawn down to thinner film using belt conveyor operated at 170 ft./min belt speed. |
| (B) | *70 | 45 | 78** | 213 | 200 | 218 | 212 | 211 | 212 | 228 | 124.7 | 2.3 | 9.89 | 3.92 | 230 | 98.2 | 443.9 | 70.4 | 5.9 | .0026-.003 inch sheet prepared by stretching at 70 ft./min. |
| (C) | | | | | 68* | 66 | 67** | 187 | 189 | 199 | 84.9 | 4.5 | 3.7 | 4.36 | 195 | 62 | 187.3 | 30.5 | 7.26 | Diacetyl was mixed with the water. 84% of diacetyl was retained and, surprisingly, the thin sheet retained more aroma. |
| (D) | | | | | 69* | 67 | 67** | 218 | 214 | 218 | 124.7 | 2.5 | 9.89 | 3.92 | 224 | 97.6 | 510.3 | 42.3 | 6.5 | 75% of synthetic was retained. |
| (E) | | | | 77 | 75* | 85** | 123 | 187 | 193 | 200 | 84.9 | 4.5 | 5.55 | 6.54 | 197 | 61.6 | 468.4 | 62.5 | 7.97 | 1% aromatized coffee oil added with coffee extract. |
| (F) | | | | 75* | 76 | 81** | 124 | 189 | 194 | 201 | 84.9 | 4.5 | 4.76 | 5.60 | 199 | 62.9 | 439 | 64.7 | 7.26 | 30% solids extract was added containing aroma. Aroma retention was 65%. |
| (G) | | | | | 68* | 67** | 221 | 211 | 222 | 222 | 286.0 | 2.3 | 10.6 | 2.7 | 251 | 197.6 | 536.9 | 60.8 | 5.1 | Film was drawn down to thinner film using a belt conveyor operated at 190 ft./min belt speed. |
| (H) | | | | | 68* | 66 | 66** | 191 | 194 | 202 | 84.7 | 4.7 | 3.7 | 4.4 | 210 | 63 | 225 | 39.4 | 8.5 | Coffee feed mixed with roasted and ground coffee. |
| (I) | | | | | 68* | 66 | 66** | 191 | 194 | 202 | 84.7 | 4.7 | 3.7 | 4.37 | 210 | 63 | 225 | 39.4 | 8.5 | |

Remarks - location of:
*Feed
**water, aroma or extract addition

What is claimed is:

1. A method of forming a transparent, stable coffee glass comprising:
    (a) preparing a mixture of 100% coffee derived solids comprising about 4%–12% water and 88% to less than 96% coffee solids, said mixture having a glass transition temperature of 30° C. to 80° C.;
    (b) heating the mixture to a temperature of 60° C. to 130° C.;
    (c) blending to form a uniform and homogeneous mixture;
    (d) forcing said mixture through a restricted area to shape it;
    (e) pulling the mixture at a rate of speed greater than the shaped mixture exits the restricted area to stretch and cool the mixture to form a thin, continuous, homogeneous, solid, transparent, film of coffee glass exhibiting luster on both the top and bottom surface of the film;
    (f) breaking the film; and
    (g) recovering the broken film at a stable moisture content of 6% water or less.

2. The method of claim 1 wherein the shaped mixture is stretched before drying to form a thin transparent film of coffee glass from 1 to 15 mils thickness.

3. The method of claim 1 wherein coffee derived flavors and/or aromas or synthetic flavors and/or colloidal ground coffee are introduced into the mixture before shaping and retained upon cooling at a level of at least 50% of the added flavor.

4. The method of claim 1 in which the film exiting the restricted area is reduced in size 2 to 20 times using mechanical means.

5. The method of claim 1 in which coffee aroma is added prior to stretching the mixture.

6. The method of claim 1 in which 10–90% ground soluble coffee is mixed with the 90%–10% coffee glass film and agglomerated to form a soluble coffee product.

7. The product produced by the process of claim 1.

* * * * *